Dec. 31, 1963   D. H. BANZHAF   3,116,089
SEAT SUSPENSION
Filed March 21, 1962
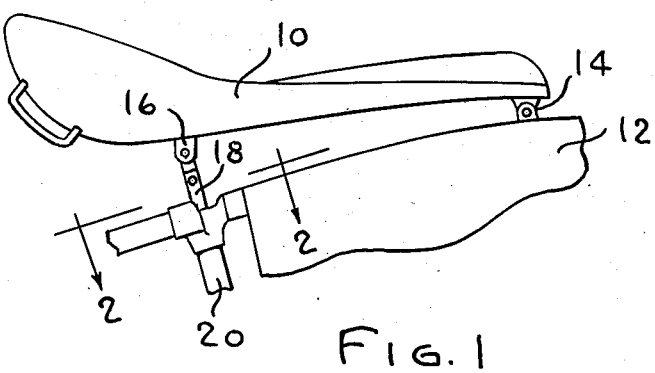
FIG. 1
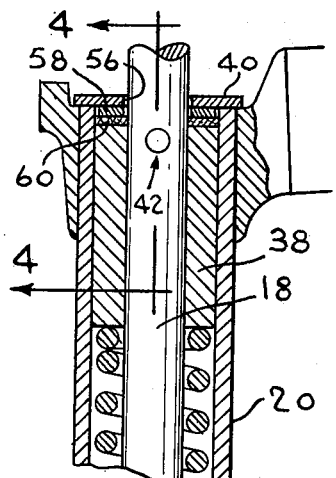
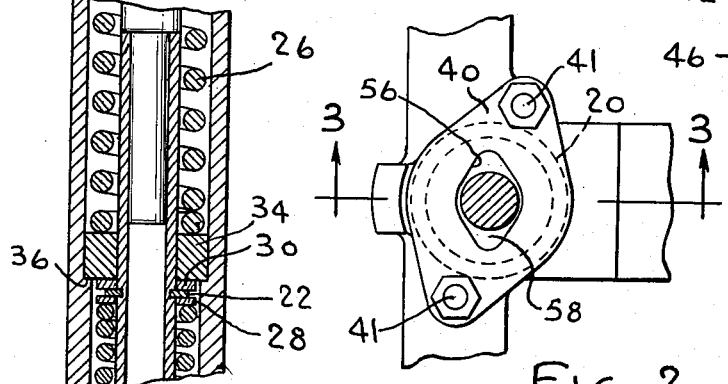
FIG. 2
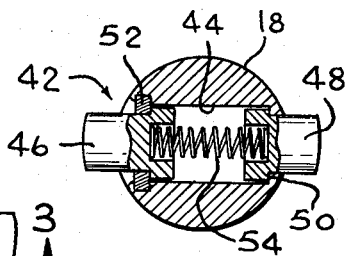
FIG. 6
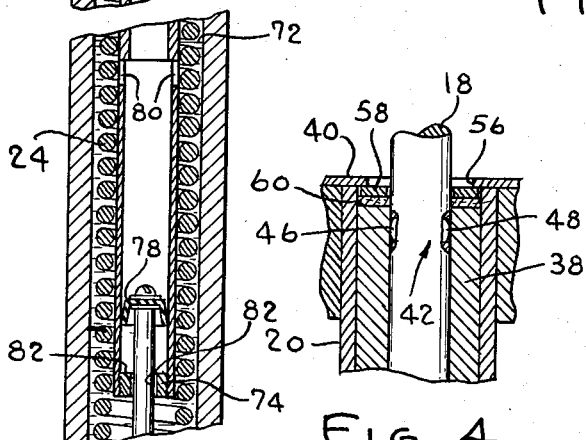
FIG. 3   FIG. 4
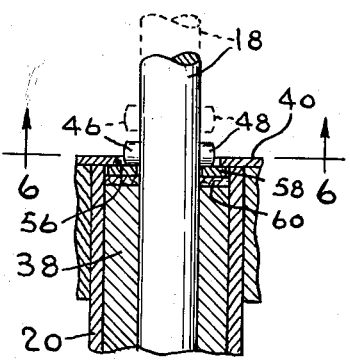
FIG. 5
INVENTOR.
DONALD H. BANZHAF
BY
Bayard H. Michael
ATTORNEY

United States Patent Office 3,116,089
Patented Dec. 31, 1963

3,116,089
SEAT SUSPENSION
Donald H. Banzhaf, Brookfield, Wis., assignor to Harley-Davidson Motor Co., Milwaukee, Wis., a corporation of Wisconsin
Filed Mar. 21, 1962, Ser. No. 181,285
14 Claims. (Cl. 297—203)

This invention relates to seat suspension mechanisms and, more particularly, to seat suspensions of the type used in motorcycles or like vehicles.

Heretofore, such suspensions have included a primary spring usually located in the center seat post and having a spring rate sufficient to accommodate one rider. To accommodate two riders, auxiliary springs were provided which could be selectively connected to increase the spring rate of the suspension and make it compatible with the load of two riders. In accordance with commonly accepted practice, the auxiliary springs were exteriorly located thereby being susceptible to damage and also detracting generally from the overall appearance of the vehicle.

An object of this invention is to provide a compact and integrally arranged seat suspension which is readily adjustable to accommodate one or two riders.

Another object is to provide an enclosed seat suspension which is readily adjustable to accommodate different seat loads.

Another consideration in such seat suspensions is what is known as seat rebound. When the seat is moved down against the spring force, the springs tend to snap the seat back to its normal position with no damping other than the hysteresis loss of the spring system.

Accordingly, another object of this invention is to provide a seat suspension which resists this rebounding force while maintaining the compact and enclosed nature of the suspension.

For the achievement of these objects this invention contemplates the provision of a compact and integrally arranged seat suspension mechanism which biases the seat toward a normal position and opposes movement of the seat in response to a load applied thereto, the suspension mechanism being selectively adjustable to oppose that seat movement with either of two forces so that the seat is equally suited for use with different loads, i.e. one or two riders. The suspension mechanism is so arranged that it can be accommodated within a hollow enclosure such as the center frame post of a motorcycle frame and also includes a mechanism which is operative to offer little or no resistance to movement of the seat away from the normal position but which retards return movement of the seat to its normal position.

The novel features of this invention are set forth in the appended claims. The invention itself, together with additional objects and advantages thereof, will be more clearly understood from a reading of the following description in connection with the accompanying drawings wherein a preferred embodiment of this invention is illustrated and in which:

FIG. 1 is a side elevation of a seat and a portion of its suspension mechanism;

FIG. 2 is a view along lines 2—2 of FIG. 1;

FIG. 3 is a sectional view along lines 3—3 of FIG. 2;

FIG. 4 is a sectional view along lines 4—4 of FIG. 3 showing the seat plunger as positioned for only one rider;

FIG. 5 is similar to FIG. 4 showing the seat plunger as positioned for two riders; and FIG. 6 is a sectional view along lines 6—6 of FIG. 5.

With particular reference to the drawings, seat 10 is illustrated as it would be mounted on a vehicle such as a motorcycle. The seat is connected at its front end to chassis 12 by hinge 14 and carries bracket 16 from which a seat post plunger 18 is hingedly suspended. Plunger 18 extends into the vehicle frame center post 20 which houses the seat suspension.

Referring to FIG. 3, retaining ring 22 is carried by plunger 18 and is positioned intermediate inner and outer springs 24 and 26. Washers 28 and 30 are disposed on either side of retaining ring 22. Washer 28 engages one end of spring 24 which is then seated between that washer and an insert 32 welded in the bottom of center post 20. Washer 30 engages a floating bushing 34 which normally rests on shoulder 36 provided in center post 20. Spring 26 is seated between floating bushing 34 and a floating bushing 38 which rests atop spring 26 and is prevented from moving out of the center post by a retaining ring 40 fixed to the top of the center post by bolts 41—41.

Preferably, when installed, spring 26 exerts a greater force than spring 24, so that bushing 34 is normally maintained in engagement with shoulder 36 and acts as a stop to limit the upward travel of retaining ring 22, and correspondingly the plunger and the seat, under the influence of spring 24. This also establishes a normal, unloaded position for the plunger wherein a spring rate adjusting mechanism 42 is held within the center post in an inoperative condition. In this normal position the seat is supported to accommodate one rider with only spring 24 opposing downward movement of the plunger, and the seat, as a result of a deflecting load applied to the seat. It should also be noted that, although spring 26 is not connected to the plunger to oppose downward movement of the seat, it does resist upward movement of the plunger and thereby opposes seat movement in that direction. Therefore, the suspension is in effect a double acting suspension system.

Spring rate adjusting mechanism 42 is disposed in diametrical opening 44 in plunger 18. Pins 46 and 48 are positioned in opening 44 with pin 48 engaging an annular shoulder 50. A retaining ring 52 is press fitted and staked into opening 44 and spring 54 biases the pins outwardly.

As can be seen in FIGS. 4 and 5, with the plunger in its normal position mechanism 42 is positioned within the post in an inoperative position so as not to interfere with motion of the plunger. More particularly, spring 26, exerting a greater force than spring 24, holds bushing 34 in engagement with shoulder 36 thereby limiting the upward travel of retaining ring 22 under the influence of spring 24 and maintaining adjusting mechanism 42 inoperative within the bore of bushing 38. To adjust the seat suspension to accommodate two riders, the seat is raised manually and plunger 18 withdrawn from the center post an amount sufficient to free mechanism 42 and allow pins 46 and 48 to move outwardly of the plunger under the influence of spring 54 (see FIGS. 5 and 6). Retaining ring 40 is provided with opening 56 so that when released the seat pins 46 and 48 clear ring 40 and engage a washer 58 which, together with a felt wiper 60, rests atop floating bushing 38. The outward movement of plunger 18 to release mechanism 42 also raises bushing 34 from shoulder 36 and compresses spring 26. After mechanism 42 and the seat have been released and pins 46 and 48 engaged with washer 58, bushing 34 will return to engagement with shoulder 36. Bushing 38 is now coupled with the plunger for joint movement therewith relative to the center post. A force tending to move the seat downward will now be resisted by both springs giving the suspension an increased spring rate sufficient to accommodate two riders. The suspension is readily converted back to accommodate one rider by merely depressing the pins and allowing the plunger to be drawn into the center post by the springs and returned to its normal position with mechanism 42 disposed within bushing 38 and inoperative.

To cushion the impact and shock when plunger 18 is bottomed, a resilient neoprene cushion 62 is connected to insert 32 by a stud 64. The stud is held in fixed relation with the insert by nut 66 and washers 68 and 70.

Suspension systems of this type are susceptible to what is known as seat rebound, i.e. after the plunger and the seat have been moved downwardly deflecting the springs, the springs tend to snap the seat upwardly to its normal position which can create a quite uncomfortable condition for the rider or riders. To alleviate seat rebound, the seat suspension is provided with a shock absorber or rebound retarder. More particularly, the lower portion of center post 20 is filled with oil or other suitable fluid to a level 72. Stud 64 extends through a plug 74 connected in the bottom of plunger 18 and into the plunger. A flexible cup-shaped member 78 is supported on the upper end of stud 64. Oil fills the interior of plunger 18 through openings 80 in the plunger and orifices 82 provided in plug 74. Member 78 acts in the nature of a one way valve in that, as plunger 18 moves downwardly, a partial vacuum is created between it and plug 74 and member 78 collapses allowing oil to fill the space therebetween. However, as the plunger is forced upwardly by the springs, member 78 is pressed against the inner walls of plunger 18 preventing the escape of oil. The oil trapped between members 78 must pass through the restricted orifices 82 thereby retarding upward motion of the plunger and alleviating the problem of seat rebound.

The discussion and illustration of this invention in relation to a particular preferred embodiment thereof has been intended for illustrative purposes only and should not be taken by way of limitation. Accordingly, it is intended in the appended claims to cover all modifications and embodiments of this invention as fall within the true spirit and scope thereof.

What I claim is:

1. A suspension mechanism for use in combination with a vehicle seat mounted for movement relative to a vehicle, said suspension mechanism comprising, a hollow enclosure, a pair of resilient members positioned within said hollow enclosure, and means for connecting one of said resilient members to continuously oppose movement of said seat when a deflecting load is applied thereto and for selectively connecting the other of said resilient members to cooperate with said one resilient member in opposing said seat movement.

2. The combination of claim 1 including shock absorber means disposed within said hollow enclosure and operative to retard rebound of said seat subsequent to said movement of said seat.

3. A suspension mechanism for use in combination with a vehicle seat and comprising, in combination, a hollow enclosure, a rigid member extending into said hollow enclosure and being connected to said seat for movement therewith, a pair of springs disposed within said hollow enclosure and engageable with said rigid member, means for guiding said rigid member for movement against the bias of said springs when a deflecting load is applied to said seat, and means for connecting one of said springs to continuously oppose said movement of said rigid member by said deflecting load and for selectively connecting the other of said springs to cooperate with said one spring in opposing said movement of said rigid member.

4. The combination of claim 3 including shock absorber means disposed within said hollow enclosure and operative to retard rebound of said seat subsequent to said movement of said rigid member.

5. A suspension mechanism for use in combination with a vehicle seat mounted for movement relative to a vehicle, a rigid member connected to and movable with said seat, a pair of coaxially arranged springs positioned with their lines of action extending parallel to the direction of movement of said rigid member, and means for connecting one of said springs to continuously oppose movement of said rigid member when a deflecting load is applied to said seat and for selectively connecting the other of said springs to cooperate with said one spring in opposing said movement of said rigid member.

6. The combination of claim 5 including shock absorber means operative to retard rebound of said seat subsequent to said movement of said rigid member.

7. A suspension mechanism for use in combination with a vehicle seat and comprising, in combination, an elongated hollow enclosure, an elongated member extending into said hollow enclosure and being connected to said seat for movement therewith, inner and outer coil springs disposed within said hollow enclosure and surrounding said elongated member, means carried by said elongated member and arranged intermediate said springs for engagement with each of said springs, said inner spring seated between said means on said elongated member and the inner end of said hollow enclosure, means for seating said outer spring at spaced apart points along said hollow enclosure and limiting the inward movement of said outer spring, said springs biasing said rigid member and said seat toward a normal position, and means for selectively connecting said outer spring to said elongated member to oppose motion of said elongated member away from said normal position when a deflecting load is applied to said seat, said connecting means operative when said elongated member is in said normal position to provide relative movement between said rigid member and said outer spring.

8. The combination of claim 7 and wherein the seating means for said outer spring includes a stop member engaging the inner end of said outer spring and also engaging said hollow enclosure to limit the inward movement of said outer spring, said stop member also engaging said means carried on said elongated member and said outer spring exerting a greater force than said inner spring.

9. The combination of claim 7 wherein said selective connecting means is carried by said elongated member and comprises at least one member movable transversely with respect to said elongated member and biased toward a normal position extending laterally of said elongated member, said transversely movable member being disposed within said elongated member when said elongated member is in its normal position and being released upon movement of said elongated member outwardly of said hollow enclosure for engagement with said outer spring so that said outer spring is connected to cooperate with said inner spring in opposing movement of said seat when a deflecting load is applied to said seat.

10. The combination of claim 7 including shock absorber means disposed within said hollow enclosure and operative to retard rebound of said seat subsequent to said movement of said seat away from said normal position.

11. The combination of claim 7 wherein said elongated member has a hollow portion at its inner end and further includes a flexible member disposed within said hollow portion of said elongated member, a fluid medium within said hollow enclosure, means for admitting said fluid to the interior of said elongated member, means providing a restricted orifice at the inner end of said elongated member, and means connecting said flexible member for movement of said elongated member relative thereto and arranging said flexible member so that upon movement of said elongated member when a deflecting load is applied to said seat said fluid medium flows freely past said flexible member and upon return movement of said elongated member said flexible member obstructs fluid flow causing the fluid to be expelled through said restricted orifice.

12. The combination of claim 11 wherein said flexible member is cup-shaped and opens toward said inner end of said elongated member.

13. A suspension mechanism for use in combination with a vehicle seat and comprising, in combination, an elongated hollow enclosure, an elongated member extending into said hollow enclosure and being connected to said seat for movement therewith, inner and outer coil springs disposed within said hollow enclosure and surrounding said elongated member, means carried by said elongated member and arranged intermediate said springs for connection with each of said springs, said inner spring seated between said means on said elongated member and the inner end of said hollow enclosure, a stop member positioned above said means carried by said elongated member and movable within said enclosure, means limiting movement of said stop member inwardly of said hollow enclosure, the inner end of said outer spring connected to said stop member and a second seating member mounted for movement within said enclosure and connected to the opposite end of said outer spring, means limiting the outward movement of said second seating member whereby said springs bias said rigid member and said seat toward a normal position, and means selectively connectable between said second member and said elongated member to connect said second member and said elongated member for joint movement in response to a deflecting load on said seat and to selectively disconnect said second member and said elongated member for relative movement therebetween so that movment of said vehicle seat from said normal position under the influence of a load is continuously opposed by said inner spring and selectively opposed by a combination of said inner spring and said outer spring.

14. The combination of claim 13 wherein said second member includes a bore with said elongated member being disposed for movement within said bore and wherein said selectively connectable means comprises at least one member movable transversely of and biased toward a normal position extending laterally of said elongated member, said transversely movable member disposed within said bore when said elongated member is in its normal position and being released upon movement of said elongated member outwardly of said hollow enclosure for connection with the outer end of the second member to connect said second spring for cooperation with said inner spring in opposing movement of said seat when a deflecting load is applied thereto.

References Cited in the file of this patent
UNITED STATES PATENTS

| | | |
|---|---|---|
| Re. 13,383 | Harley | Mar. 12, 1912 |
| 1,024,684 | Harley | Apr. 30, 1912 |
| 1,304,585 | McFarland | May 27, 1919 |
| 2,167,912 | Schwinn | Aug. 1, 1939 |
| 2,467,676 | Labine | Apr. 19, 1944 |
| 2,639,760 | Von Szilagyi | May 26, 1953 |